(12) United States Patent
Akpata

(10) Patent No.: US 9,282,847 B2
(45) Date of Patent: Mar. 15, 2016

(54) EDO CUP

(71) Applicant: Reginald Osagie Akpata, Long Beach, CA (US)

(72) Inventor: Reginald Osagie Akpata, Long Beach, CA (US)

(*) Notice: Subject to any disclaimer, the term of this patent is extended or adjusted under 35 U.S.C. 154(b) by 485 days.

(21) Appl. No.: 13/765,902

(22) Filed: Feb. 13, 2013

(65) Prior Publication Data

US 2013/0270175 A1    Oct. 17, 2013

Related U.S. Application Data

(60) Provisional application No. 61/598,983, filed on Feb. 15, 2012.

(51) Int. Cl.
| | | |
|---|---|---|
| *B01D 24/20* | (2006.01) | |
| *B01D 29/01* | (2006.01) | |
| *A47J 31/06* | (2006.01) | |

(52) U.S. Cl.
CPC .......... *A47J 31/0636* (2013.01); *A47J 31/0626* (2013.01); *B01D 24/20* (2013.01); *B01D 29/016* (2013.01)

(58) Field of Classification Search
CPC ... A47J 31/0636; A47J 31/06; A47J 31/0626; A47J 31/08; A47J 31/005; A47J 31/446; A47J 31/0631; B01D 23/02; B01D 23/08; B01D 24/00; B01D 24/20; B01D 24/205; B01D 24/22; B01D 29/01; B01D 29/012; B01D 29/014; B01D 29/016; B01D 29/03; B01D 29/031; B01D 29/035; B01D 29/05; B01D 29/07; B01D 29/071; B01D 39/16; B01D 39/1607; B01D 39/1615; B01D 39/1669; B01D 39/2055

USPC ................. 210/473, 464, 465, 470, 474, 482; 99/279, 295, 304, 306, 307, 316, 317, 99/321–323; 426/77–80, 82, 84, 433
See application file for complete search history.

(56) References Cited

U.S. PATENT DOCUMENTS

| | | | | |
|---|---|---|---|---|
| 2,287,648 | A * | 6/1942 | Sunderhauf | B65D 5/02 229/120.14 |
| 3,971,305 | A | 7/1976 | Daswick | |
| 4,715,271 | A | 12/1987 | Kitagawa | |
| 5,059,325 | A * | 10/1991 | Iida | 210/474 |
| 5,605,710 | A * | 2/1997 | Pridonoff | A47J 31/02 206/0.5 |
| 5,771,777 | A * | 6/1998 | Davis | A47J 31/02 99/279 |
| 6,079,318 | A * | 6/2000 | Davis | A47J 31/005 99/279 |
| 7,235,272 | B2 * | 6/2007 | Saitoh et al. | 426/82 |
| 8,746,131 | B2 | 6/2014 | Saitoh | |
| 2004/0222147 | A1 * | 11/2004 | Post | A47J 31/08 210/493.1 |
| 2005/0279220 | A1 * | 12/2005 | Cheng | A47J 31/0636 99/323 |
| 2007/0151460 | A1 * | 7/2007 | Beck | A47J 31/08 99/279 |
| 2009/0004351 | A1 * | 1/2009 | Maurer | A47J 31/0631 426/433 |

OTHER PUBLICATIONS

Reginald Akdata (Barbeach Boy), #Edocup, Instagram, Published Oct. 1, 2014 at Huntington Beach, California Huntington Beach High School Pool Deck.

* cited by examiner

*Primary Examiner* — Joseph Drodge

(57) ABSTRACT

The Edo Cup is an in cup open suspended, accordion type paper single cup fillable beverage disposable filter. The filter can be in several shapes and sizes and may display corporate logs, up to an including religious symbols, sayings and holiday messages. The filter may enclose flavors (in the filter paper) or be pre-soaked in flavors prior to packaging for sale.

4 Claims, 5 Drawing Sheets

Figure 1:
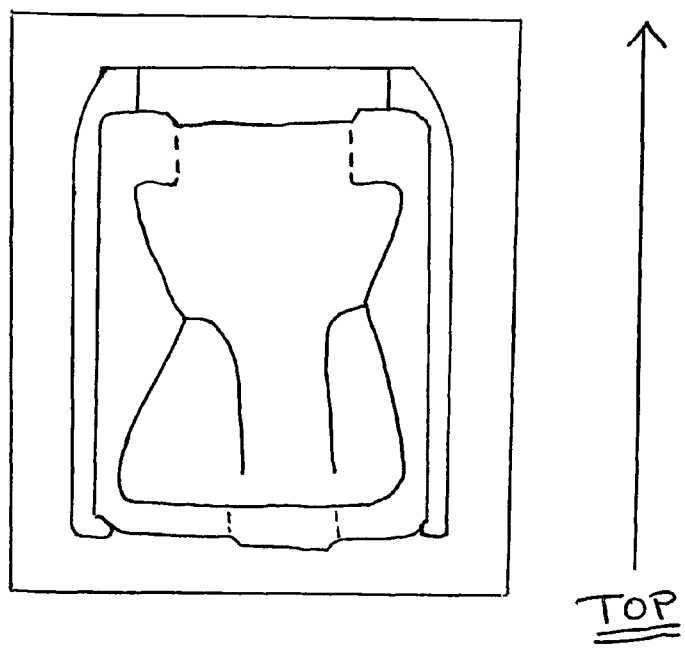

Side view; paper filter lying flat exposing acordian suspension slightly opened, and open side fillable top

TOP

Side view; paper filter lying flat exposing acordian suspension and open side fillable top

TOP

Side view; paper filter lying flat exposing acordian suspension slightly opened, and open side fillable top Top view; paper filter open over cup exposing opened area for beverage and water input, and open fillable top Top view; paper filter open at 180 degrees sideways view over cup exposing opened area for beverage and water input, open fillable top and filter side hinge on cup lip Top view; paper filter open at 180 degrees sideways view over cup exposing opened area for beverage and water input, open fillable top and filter side hinge on cup lip: beverage is applied and liquid: water (hot/cold) or milks

EDO CUP

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

The Edo cup is a beverage device and solves the problem encountered in ingesting fresh ground coffee in a disposable filter without using a non-disposable device. The Edo Cup device becomes key situations.
1. Military officers on a mission where they can only carry light loads and must not—for safety sake leave behind evidence having been there.
2. Students in a dormitory where coffee percolators or other electronic devices cannot be used.
3. Victims of natural disasters who are confined to places where electronic devices are un-available, but are availed of hot water from a thermos.
4. Campers keen to enjoy fresh coffee while camping but keen not to leave behind trash for feral animals, can use the Edo Cup and convey it to a safe disposal area to be discarded.

BRIEF SUMMARY OF THE INVENTION

The Edo cup enables the user Edo Cup enables the user to use a completely disposable filter to brew a beverage, then discard the filter and beverage components as biodegradable matter.

Its conical shape with fluted pour over area makes it significantly different from like devices listed in the patent registry, at once new but ancient—when at use—in the mimicry of the ancient art of brewing coffee through a filter. Daswick U.S. Pat. No. 3,971,305 comes closest in understanding that efficacy in the extraction lies in a large pour over area and a conical vortex. Because of the conical shape of the filter and its inverted vortex, it is advantageous to imbibing such a quality of beverage such as competition scored and cupped Specialty Coffee. Specialty Coffee as defined by the Specialty Coffee Association of America (SCAA), is: Coffee cupped and scored by a trained and certified coffee Q-Coffee-grader at a score of 85 or greater over a possible score of 100, using the prescribed (SCAA) coffee cupping sheet. The Edo-Cup contains features that will make it more acceptable to the specialty coffee and other specialty beverage industries. Its construction with a vast fluted area over which liquid can be poured and then drained into a single conical vortex will ensure its adoption in the specialty beverage industry for its efficacy.

BRIEF DESCRIPTION OF THE SEVERAL VIEWS OF THE DRAWING(S)

Figure 2:
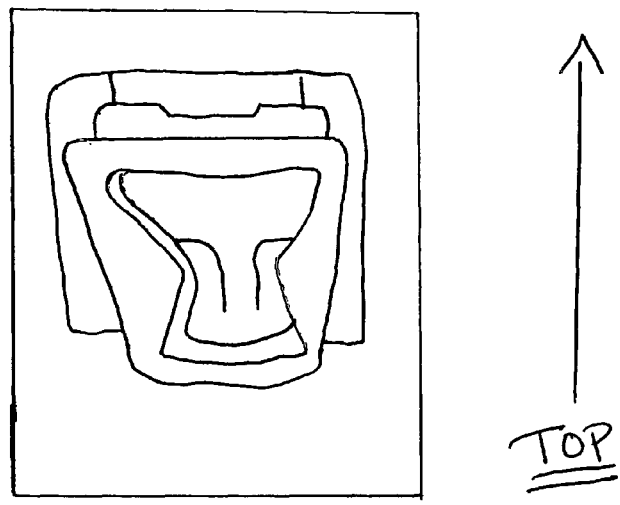
Figure 3:
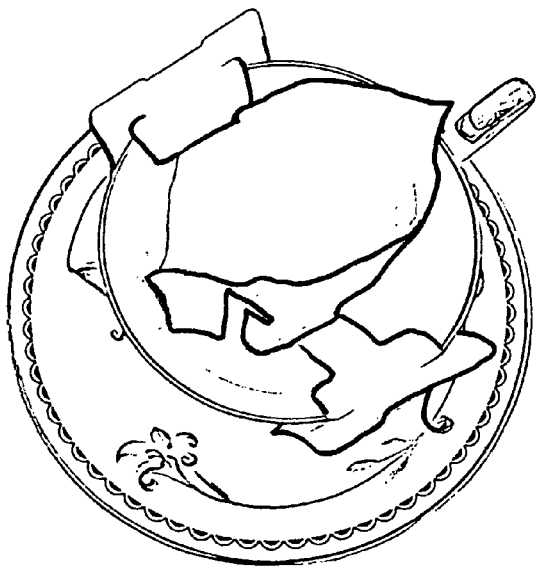
Figure 4:
Figure 5:
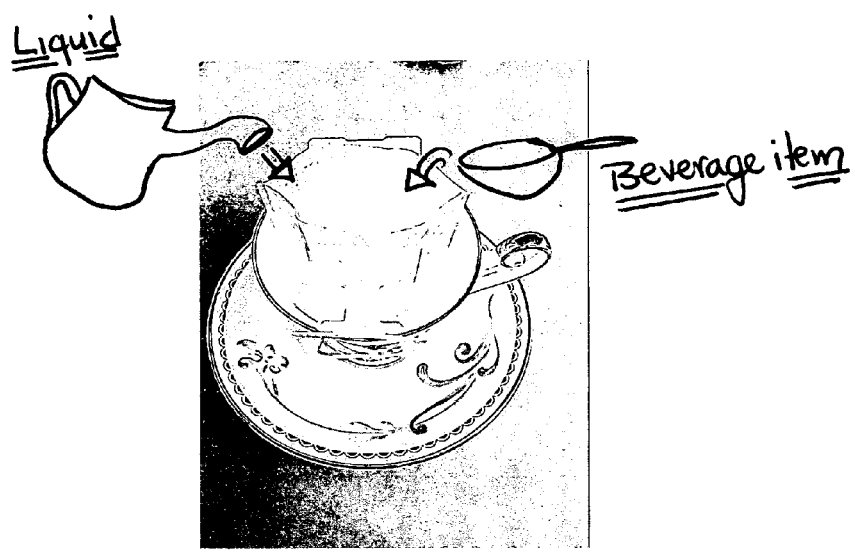

FIG. 1 depicts the Edo Cup, side view. Edo Cup lying flat on a surface.
FIG. 2 depicts the deployed upper wing shown in FIG. 1 and the vortex of the cone.
FIG. 3 depicts the accordion effect of the wings mid deployment.
FIG. 4 depicts the filter from a rear view.
FIG. 5 depicts the fully deployed device.

DETAILED DESCRIPTION OF THE INVENTION

"Edo Cup":—cup, open, suspended, accordion type, paper, single cup, fillable beverage disposable filter. Specifically from FIGS. 1 and 2, a disposable drip beverage device comprising a die-cut and die-scored paper card forming a quadrilateral accordion suspension containing a porous beverage filter is provided wherein the filter is constructed and arranged to sit atop a single beverage cup and where the beverage filter is a disposable conical filter which when deployed forms a conically shaped vessel that meets exacting brewing standards. The die scoring comprises a pair of L-shaped crease scores, with one side of each of the L-shaped crease scores extending inwardly from opposite sides of another die score that substantially forms a die score quadrilateral, with the other side of each of the L-shaped crease scores extending towards a perpendicular side of the die score quadrilateral. The filter which is made of filter paper can be pre-soaked with a flavoring or can enclose one or more flavorants. The disposable drip beverage device may display on its sides: corporate logos; up to and including religious symbols; sayings; and holiday messages. Filter may enclose flavors (in the filter paper) or be pre-soaked in flavors prior to packaging for sale. FIGS. 1 and 2 show the Edo Cup, side view, Edo Cup lying flat on a surface. The user slowly deploys the vessel support wings elements (10, 11) on each side that will form the suspension device; the user simultaneously, applies pressure to the paper crease at FIGS. 1 and 3 as shown as element (12). The conical filter then deploys, me sole seal in the vessel of the conical self-suspending filter being along the die cut crease line indicated by FIG. 1, 4, 5. The filter is then placed on the vessel to receive the beverage, wings attached as vessel supports. Beverage elements such as fresh ground coffee are then added to the vessel; boiling water is then poured on top of the elements to create the beverage. At the conclusion of the brew process the brew elements such as coffee grounds are then discarded along with the used filter paper. The invention known as the Edo Cup is an invention in the USPTO Category of Class 99 beverage devices. The invention known as the Edo Cup is another device that solves the problem encountered in brewing fresh ground coffee in a disposable filter without using any non-disposable device as an assistant. See: U.S. Pat. No. 7,235,272, Saltoh et al. FIG. 5 shows the EdoCup suspended, ready to be filled by coffee grounds or tea and then water.

The invention claimed is:

1. A disposable drip beverage comprising of: a die-cut and die-scored paper card forming a quadrilateral accordion suspension, containing a porous beverage filter, said filter is constructed and arranged to sit atop a single beverage cup; wherein the beverage filter is a disposable conical filter which when deployed forms a conically shaped vessel that meets exacting brewing standards, wherein the die scoring comprises a pair of L-shaped crease scores, with one side of each of the L-shaped crease scores extending inwardly from opposite sides of another die score that substantially forms a die score quadrilateral, with the other side of each of the L-shaped crease scores extending towards a perpendicular side of the die score quadrilateral.

2. The device of claim 1, wherein the filter comprises filter paper pre-soaked in flavor.

3. The device of claim 1, wherein the filter encloses one or more flavors.

4. The device of claim 1, wherein the device displays one or more logos.

* * * * *